United States Patent
Li et al.

(10) Patent No.: US 9,173,214 B2
(45) Date of Patent: Oct. 27, 2015

(54) METHOD, USER EQUIPMENT, BASE STATION AND SYSTEM FOR DETERMINING COMPONENT CARRIER SCHEDULED IN CROSS-CARRIER SCHEDULING

(71) Applicant: FUJITSU LIMITED, Kawasaki-shi, Kanagawa (JP)

(72) Inventors: Jike Li, Beijing (CN); Yuantao Zhang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 13/849,833

(22) Filed: Mar. 25, 2013

(65) Prior Publication Data
US 2013/0215853 A1 Aug. 22, 2013

Related U.S. Application Data

(63) Continuation of application No. PCT/CN2010/077399, filed on Sep. 28, 2010.

(51) Int. Cl.
*H04W 72/04* (2009.01)
*H04L 5/00* (2006.01)
(Continued)

(52) U.S. Cl.
CPC .............. *H04W 72/042* (2013.01); *H04L 5/001* (2013.01); *H04L 5/0053* (2013.01); *H04L 5/0094* (2013.01); *H04L 5/0064* (2013.01);
(Continued)

(58) Field of Classification Search
CPC .... H04W 24/00; H04W 72/04; H04W 72/042
See application file for complete search history.

(56) References Cited

U.S. PATENT DOCUMENTS

2013/0058240 A1* 3/2013 Kim et al. .................... 370/252

FOREIGN PATENT DOCUMENTS

| CN | 101714892 | 5/2010 |
| CN | 101801090 | 8/2010 |

(Continued)

OTHER PUBLICATIONS

LG Electronics; "construction of PDCCH search spaces for cross carrier scheduling in carrier aggregation", Agenda item: 7.1.3. Feb. 22-26, 2010, R1-101347, 3GPP TSG RAN WG1 #60, San Francisco, USA.
ZTE, "PDCCH search space for cross-carrier scheduling in LTE-A", Agenda Item: 6.2.1.1, Aug. 23-27, 2010, R1-104551, 3GPP TSG-RAN WG1 #62. Madrid, Spain.
Notice of Preliminary Rejection issued for corresponding Korean Patent Application No. 10-2013-7010972, mailed on Apr. 14, 2014, with an English translation.
(Continued)

*Primary Examiner* — Andrew Lai
*Assistant Examiner* — Leon Andrews
(74) *Attorney, Agent, or Firm* — Myers Wolin, LLC

(57) ABSTRACT

A method, user equipment, base station and system for determining a component carrier scheduled in cross-carrier scheduling. The method for determining the scheduled component carrier includes: a user equipment (UE) detects scheduling information sent by a base station in a first dedicated searching space corresponding to a scheduling component carrier, the first dedicated searching space includes at least one candidate physical downlink control channel (PDCCH) (101); detecting at least one candidate physical downlink control channel (PDCCH) to obtain a current physical downlink control channel (PDCCH) which belongs to the user equipment (UE) (102); determining a scheduled component carrier corresponding to the current physical downlink control channel (PDCCH) according to the location of the current physical downlink control channel (PDCCH) and the carried carrier indicator field (CIF) value thereof (103).

14 Claims, 7 Drawing Sheets

(51) Int. Cl.
  *H04W 48/16* (2009.01)
  *H04W 72/12* (2009.01)
  *H04W 88/08* (2009.01)

(52) U.S. Cl.
  CPC .............. *H04W 48/16* (2013.01); *H04W 72/12* (2013.01); *H04W 88/08* (2013.01)

(56) References Cited

FOREIGN PATENT DOCUMENTS

| | | | |
|---|---|---|---|
| JP | 2011-22333 | A | 11/2011 |
| JP | 2011-223112 | A | 11/2011 |
| WO | 2011/021617 | A1 | 2/2011 |
| WO | 2011/112036 | A2 | 9/2011 |
| WO | 2011/155708 | A2 | 12/2011 |

OTHER PUBLICATIONS

Qualcomm Europe, "Interpreling the Carrier indicator Field", Agenda Item: 7.2.1.1, Nov. 9-13, 2009, 3GPP TSG RAN WG1 #59, R1-095069, Jeju, Korea.

Notice of Reason for Refusal issued for corresponding Japanese Patent Application No. 2013-530514, mailed on Feb. 18, 2014, with an English translation.

International search report issued for corresponding International Patent Application No. PCT/CN2010/077399, mailed Jul. 7, 2011, with English translation.

Notification of the First Office Action issued for corresponding Chinese Patent Application No. 2015013001034910 dated Feb. 4, 2014, with an Elglish translation.

\* cited by examiner

TOTAL NUMBER OF
CCES

METHOD, USER EQUIPMENT, BASE STATION AND SYSTEM FOR DETERMINING COMPONENT CARRIER SCHEDULED IN CROSS-CARRIER SCHEDULING

CROSS-REFERENCE TO RELATED APPLICATIONS

The present application is a continuation of PCT Application No. PCT/CN2010/077399, now pending, filed on Sep. 28, 2010, the contents of which are herein wholly incorporated by reference.

FIELD OF THE INVENTION

The present invention generally relates to a wireless communication technology, particularly to a method, in a multi-carrier system, of determining a scheduled component carrier, and more particularly to a method, in a device of a wireless communication system (e.g., a base station and a user equipment), of determining a scheduled component carrier and a user equipment, base station and system for performing the method.

BACKGROUND OF THE INVENTION

Resources of a system in the LTE-R8 are divided into a two-dimension gird in the time and frequency domains, where the smallest resource unit in the time domain is an Orthogonal Frequency Division Multiplexing (OFDM) symbol, and the smallest resource unit in the frequency domain is a sub-carrier. In the LTE-R8 standard, there is a Physical Downlink Control Channel (PDCCH) in which Downlink Control Information (DCI) can be transmitted. In across-carrier scheduling, a User Equipment (UE) in a cell has to listen to a PDCCH for system information and scheduling information, where the scheduling information can signal to the UE where to receive and how to process downlink data transmitted over a scheduled component carrier.

In the LTE-R8 system, the scheduling information can be transmitted in first several OFDM symbols of a frame, and these several OFDM symbols logically used to transmit the scheduling information can be divided into several Control Channel Elements (CCEs). CCEs are the smallest resource units of which the DCI is constituted, and the number of CCEs of which the DCI is constituted is referred to the aggregation level of a PDCCH. A possible of the aggregation level of a PDCCH is 1, 2, 4 or 8, that is, a piece of integral DCI can be consisted of 1, 2, 4 or 8 CCEs.

A User Equipment (UE) is typically provided with a corresponding PDCCH search space at a specific aggregation level, and if across-carrier scheduling is adopted in the case of carrier aggregation, then the UE has to detect scheduling information of a different scheduled component carrier over the same scheduling component carrier. Thus in across-carrier scheduling, an eNB (base station) will transmit both control information of the scheduling component carrier and other control information of the scheduled component carrier to the UE over the scheduling component carrier. Thus the eNB has to divide CCEs of the scheduling component carrier into search spaces of different component carriers for concurrent transmission of scheduling information corresponding to the different component carriers. Also in order to prevent any confusion between the scheduling information of the different component carriers of the same user equipment, a Carrier Indicator Field (CIF) of 3 bits has to be further added preceding the DCI to distinguish among the different component carriers.

In the prior art the length of a CIF is 3 bits, and the value represented by the CIF identifies uniquely another component carrier scheduled by the current scheduling component carrier. Since the CIF is specified in the LTE-R10 as 3 bits ranging from 0 to 7, only 8 different component carriers in total can be represented by the CIF. Stated otherwise, when the UE determines a component carrier and subsequently receives data borne over the component carrier by calculating the CIF as in the prior art, the process can be performed only on 8 component carriers, but the UE can not determine a larger number of component carriers and subsequently receive data thereof; and furthermore there may be a relative waste of system resource because the different component carriers are characterized by the 3 bits all the time In summary, how to determine a larger number of component carriers and correspondingly, for a base station, how to transmit scheduling information of a scheduled component carrier to a UE when there are a larger number of component carriers, and furthermore how to characterize the different component carriers while conserving the system resource are respective technical problems highly desired to be addressed.

SUMMARY OF THE INVENTION

In view of this, an object of embodiments of the invention is to provide a method and user equipment of determining a scheduled component carrier, where a current PDCCH is detected among at least one candidate PDCCHs as per scheduling information transmitted from a base station; and further a scheduled component carrier corresponding to the current PDCCH is determined according to the location of Downlink Control Information (DCI) in the current PDCCH and the value of a Carrier Indicator Field (CIF) carried therein.

Another object of the embodiments of the invention is to provide a method and a base station of transmitting scheduling information of a scheduled component carrier, which is capable of calculating the value of a CIF for a scheduled component carrier of a UE, generating a current PDCCH of the UE by combining the value of the CIF and DCI information, and transmitting scheduling information including the current PDCCH to the UE over a scheduling component carrier.

According to an aspect of the embodiments of the invention, there is provided a method, applicable to a User Equipment (UE) of a multi-carrier wireless communication system, of determining a scheduled component carrier, including: the UE receiving scheduling information transmitted from a base station (eNB) in a first dedicated search space corresponding to a scheduling component carrier, wherein the first dedicated search space could include at least one candidate Physical Downlink Control CHannel (PDCCH); detecting the at least one candidate PDCCH for obtaining a current physical downlink control channel belonging to the UE; and determining a scheduled component carrier corresponding to the current PDCCH according to the location of the current PDCCH and the value of a Carrier Indicator Field (CIF) carried therein.

According to another aspect of the embodiments of the invention, there is provided a User Equipment (UE), applicable to a multi-carrier wireless communication system, including: a receiving module configured to receive scheduling information transmitted from an eNB in a first dedicated search space corresponding to a scheduling component carrier of the UE, wherein the scheduling information includes at least one candidate Physical Downlink Control Channel (PD- CCH); a detecting module configured to detect the at least one candidate PDCCH for obtaining a current PDCCH belonging to the UE; and a determining module configured to determine a scheduled component carrier corresponding to the current PDCCH according to the location of the current PDCCH and the value of a Carrier Indicator Field (CIF) carried therein.

According to still another aspect of the embodiments of the invention, there is provided a method, applicable to a base station (eNB) of a multi-carrier wireless communication system, of transmitting scheduling information of a scheduled component carrier, including: calculating the value of a Carrier Indicator Field (CIF) for a scheduled component carrier of a User Equipment (UE); generating a current PDCCH of the UE based on the value of the CIF and Downlink Control Information (DCI); and transmitting scheduling information including the current PDCCH to the UE over a scheduling component carrier.

According to a further aspect of the embodiments of the invention, there is provided a base station, applicable to a multi-carrier wireless communication system, including: a calculating module configured to calculate the value of a Carrier Indicator Field (CIF) for a scheduled component carrier of a User Equipment (UE); a candidate PDCCH generating module configured to generate a current PDCCH of the UE by combining the value of the CIF and Downlink Control Information (DCI); and a scheduling information transmitting module configured to transmit scheduling information including the PDCCH to the UE over a scheduling component carrier.

According to a further aspect of the embodiments of the invention, there is provided a multi-carrier wireless communication system including the foregoing user equipment and base station provided according to the invention.

According to a further aspect of the embodiments of the invention, there is provided a program product on which machine readable instruction codes are stored, where the instruction codes upon being read and executed by a machine can perform the method of determining a scheduled component carrier provided according to the invention.

According to a further aspect of the embodiments of the invention, there is provided a storage medium on which machine readable instruction codes are borne, where the instruction codes upon being read and executed by a machine can perform the method of determining a scheduled component carrier provided according to the invention.

According to the foregoing technical solutions of the embodiments of the invention, after detecting a PDCCH, a UE takes component carriers to which the location of DCI in the PDCCH may possibly belong as a group of search spaces and can determine uniquely a specific component carrier to which the control information carried in the currently detected PDCCH belongs further in combination of information in a CIF. Since no sequence number of any component carrier is represented directly by the CIF, the embodiments of the invention can enable a larger number of component carriers to be determined in a multi-carrier wireless communication system, and also even if it is not required to determine a larger number of component carriers, not all 3 bits of the CIF are in use so that the remaining one or two bits of the CIF can be spared to represent other control information, etc., to thereby further conserve a system resource.

Other aspects of the embodiments of the invention will be given in the following specification in which a detailed description is intended to sufficiently disclose but not to limit preferred embodiment of the invention.

BRIEF DESCRIPTION OF THE DRAWINGS

The foregoing and other objects and advantages of the invention will be further described below in connection with particular embodiments and with reference to the drawings in which identical or corresponding technical features or components will be denoted by identical or corresponding reference numerals.

DETAILED DESCRIPTION OF THE INVENTION

Embodiments of the invention will be described below with reference to the drawings.

As disclosed in the embodiments of the invention, a UE can receive scheduling information transmitted from a base station eNB in a first dedicated search space corresponding to a scheduling component carrier, where the first dedicated search space could include at least one candidate Physical Downlink Control CHannel (PDCCH); and the UE can detect the at least candidate PDCCH for a current PDCCH belonging to the UE and further determine uniquely a scheduled component carrier corresponding to the current PDCCH according to the location of the current PDCCH and the value of a Carrier Indicator Field (CIF) carried therein, where a group of search spaces of all possible component carriers present at the location of the PDCCH can be determined by the location; a unique search space can be determined in the group of search spaces simply by the value of the CIF, and a search space corresponds uniquely to a scheduled component carrier.

Correspondingly as disclosed in the embodiments of the invention, the eNB will also transmit the scheduling information of the scheduled component carrier to the UE in a wireless communication system with carrier aggregation, where the eNB firstly calculates the value of the CIF for the scheduled component carrier of the UE, and then the eNB generates the current PDCCH of the UE based upon the value of the CIF and Downlink Control Information (DCI) and transmits the scheduling information to the UE over the scheduling component carrier, where the scheduling information includes the PDCCH. Since in the embodiments of the invention, the UE can determine a group of search spaces by the location of the current PDCCH, and at this time, a search space in the group of search spaces can be indicated simply by the CIF calculated by the eNB, where the value of the CIF will simply represent the number of reoccurrences of the location of the PDCCH in each of search spaces of different component carriers designed as per the size of the dedicated search space and the total number of available CCEs.

Figure 2:
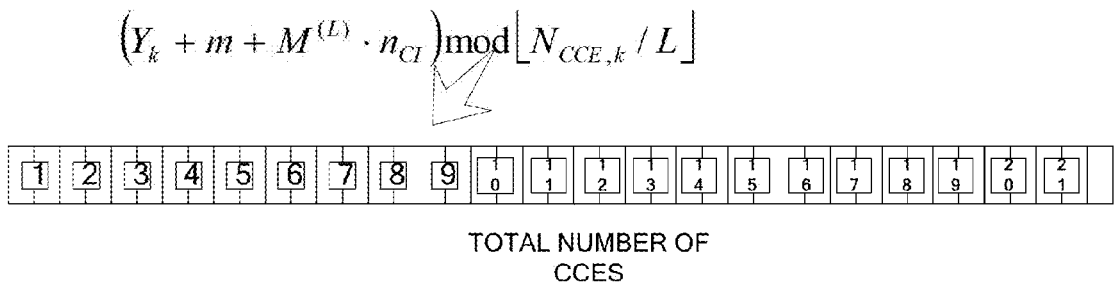
FIG. 2 is a schematic diagram of the total number of CCEs in the embodiment of determining a scheduled component carrier as illustrated in FIG. 1.

In order to assist those skilled in the art in better understanding of the value of the CIF in the embodiments of the invention, the CIF will be described below by way of an example with reference to FIG. 2 and FIG. 3. For example, there are 43 CCEs in total, and given a aggregation level 2 of the PDCCH, there are 21 pieces of DCI, and there are 6 pieces of DCI, i.e., 12 CCEs, in a search space, so only 3 search spaces (SS1, SS2 and SS3) can be arranged for the 43 CCEs; and the number of CCEs is not sufficient to arrange SS4, so search spaces (i.e., SS4, SS5 and SS6) will be ranked starting from the first CCE after a modulus operation is performed. In this case, there is no overlapped CCEs across SS1, SS2 and SS3, but there are overlapped CCEs repeated between SS1 and SS4, between SS2 and SS5 and between SS3 and SS6, and then in this example, there is no overlapped CCE across SS1, SS2 and SS3 for the first time for which a corresponding character of "0" is assumed, and there is no CCE overlapped across SS4, SS5 and SS6 for the second time for which a corresponding character of "1" is assumed. The value of CIF will simply represent that character (0 or 1) in corresponding search space. As can be apparent, the characters of "0", "1", etc., are used in this example to represent the number times that the CCEs are repeated in the ranking (i.e., a row number in FIG. 3), but those skilled in the art can appreciate that any characters can be used so long as a mapping relationship between each of these characters and the number of times that the CCEs are actually repeated in the ranking is prescribed.

In the embodiments of the invention, the scheduled component carrier refers to a specific band among a plurality of frequency bands for use in interaction communication between the UE and the eNB. The UE can transmit control information of all data transmitting frequency bands over a frequency band, where a specific scheduled frequency band is defined as a component carrier which includes the scheduling component carrier itself because data information is also transmitted over the scheduling component carrier.

Figure 1:
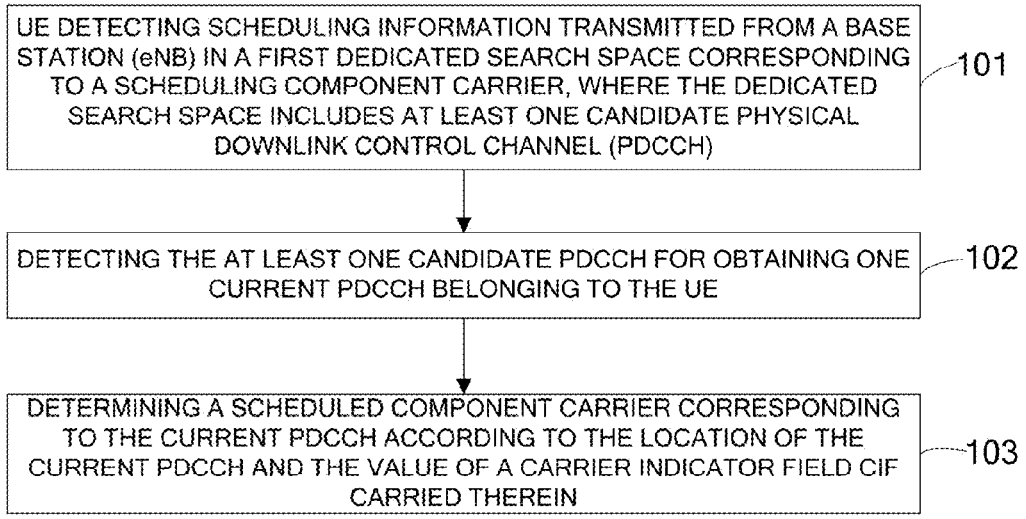
FIG. 1 is a schematic flow chart of an embodiment of determining a scheduled component carrier according to the invention.

In order to assist those skilled in the art in better understanding of the invention, an embodiment of the invention in a practical application will be detailed below. Referring to FIG. 1 illustrating a flow chart of an embodiment of the invention, this embodiment primarily applicable to a UE of a multi-carrier wireless communication system can particularly include the steps 101, 102 and 103. Operations of the respective steps will be detailed below.

In the step 101, a UE receives scheduling information transmitted from a base station eNB in a first dedicated search space corresponding to a scheduling component carrier, where the first dedicated search space includes at least one candidate Physical Downlink Control CHannel (PDCCH).

The search space in the embodiment of the invention includes a group of specific CCEs in a set of CCEs constituting a control channel of a component carrier, several pieces of DCI can be put in the group of specific CCEs, and a piece of DCI belongs correspondingly to a PDCCH, where the particular number of pieces of DCI can vary with a different aggregation level of the PDCCH. For a different UE, it can determine the starting location of its own search space according to its own Radio Network Temporary Identifier (RNTI) and current frame number and thereby receive the scheduling information transmitted from the eNB in its own search space. The embodiment of the invention can be applicable to across-carrier scheduling, and the UE can be provided with a different search space corresponding to a different component carrier.

Given a 100 MHz bandwidth of the scheduling component carrier and a number 2 of antenna ports in this embodiment, in this case, there are 43 CCEs in total available in the PDCCH domain of the scheduling component carrier, and the embodiment of the invention will be described by way of an example given an aggregation level 2 of the PDCCH, that is, where a piece of DCI is constituted of two CCEs. Referring to FIG. 2 illustrating a schematic diagram of the total number of CCEs in this embodiment, the formula illustrated in FIG. 2 depicts a way to calculate the sequence number of a DCI location according to the RNTI and frame number of the UE. There are illustrated 21 small boxes in total numbered 1, 2, . . . , 21 to represent the sequence numbers of DCI, and as can be apparent, each piece of DCI is constituted of two CCEs.

Figures 3, 4:
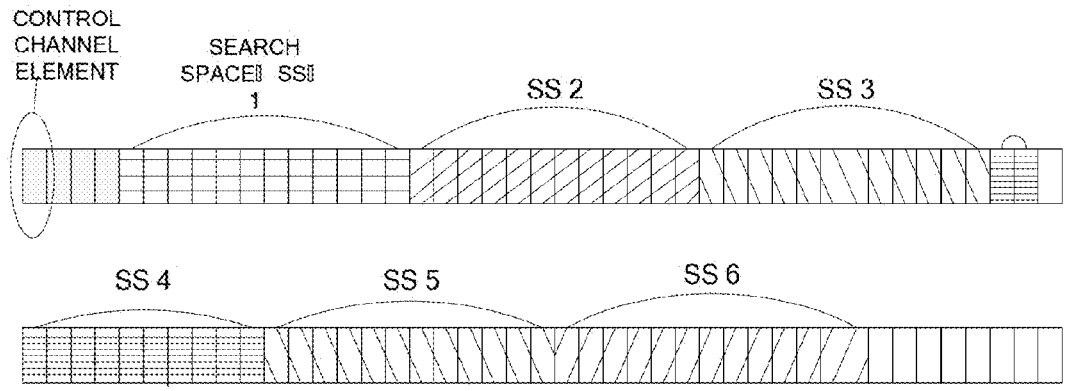
FIG. 3 is a schematic arrangement diagram of search spaces of respective scheduled component carriers in the embodiment as illustrated in FIG. 1.
FIG. 4 is a flow chart of a particular implementation of the step 103 in the embodiment of determining a scheduled component carrier as illustrated in FIG. 1.

Also referring to FIG. 3 illustrating is a schematic diagram of the locations where Search Spaces (SSs) of respective scheduled component carriers are arranged in a control signal area of a scheduling component carrier with across-carrier scheduling. A rectangular box indicated by an ellipse in FIG. 3 represents a CCE, and there are two rows of CCEs in the arrangement of CCEs illustrated in FIG. 3, but there are actually only one set of CCE resources (43 CCEs in total), that is, one row of CCEs in FIG. 3 represents a round of ranking the CCEs in a search space without being overlapped, and another row is used in the vertical direction to distinguish SS4, SS5 and SS6 in FIG. 3 so as to distinguish a different search space in which the CCEs are ranked without being overlapped for the second time, so a scheduled component carrier can be determined simply by representing "0" or "1" as the value of a CIF.

The step 102 is to detect the at least candidate PDCCH for a current PDCCH belonging to the UE.

After a current PDCCH of the UE is detected by the RNTI, a specific component carrier corresponding to the current PDCCH will be further calculated from the value of the CIF in the detected PDCCH. As can be apparent from FIG. 3, the search spaces are arranged consecutively in this embodiment in the sense of performing a modulus operation on the total number of CCEs, that is, in the embodiment of the invention, the search spaces shall also satisfy such a condition that the respective search spaces be distributed consecutively or at a fixed interval so that the UE can determine uniquely the search space of the component carrier to which the detected current PDCCH belongs by the location of the current PDCCH.

The search spaces can be designed in across-carrier scheduling in the following formula:

$$S_{k,n_{CI}}^{(L)} = L \cdot \{(Y_k + m + M^{(L)} \cdot n_{CI}) \bmod \lfloor N_{CCE,k}/L \rfloor\} + i,$$

Where L represents the aggregation level of the current PDCCH of the UE; $N_{CCE,k}$ represents the total number of CCEs available to the current scheduling component carrier; $Y_k$ represents a pseudorandom number determined uniquely by the RNTI and frame number of the UE; $M^{(L)}$ represents the number of candidate PDCCHs of the UE in the search space at an aggregation level L; $n_{CI}$ represents the sequence number of the ranked search space; and mod represents a modulus operation. As informed in the foregoing formula, the search spaces of the respective different component carriers are consecutive in the sense of performing a modulus operation on the total number of PDCCHs that can be put in all the current CCEs, so there is a fixed set of search spaces at the location of a candidate PDCCH, and the PDCCH present at the location can only belong to a search space in this set of search spaces.

The step 103 is to determine a scheduled component carrier corresponding to the current PDCCH according to the location of the current PDCCH and the value of a Carrier Indicator Field (CIF) carried therein.

In this embodiment, the scheduled component carrier is determined dependent upon both the location information of the current PDCCH and the value of the CIF carried therein, and after the current PDCCH is detected, the UE can know the location of the current PDCCH and further know those search spaces possibly present at the location of the current PDCCH, that is, determine search spaces possibly belonging to several specific component carriers, where these several determined search spaces can be regarded as a group of search spaces possibly present at the location of the PDCCH. The search space of a specific component carrier in the determined group of search spaces can be determined simply by the value of the CIF.

In this embodiment, the value of the CIF depends upon the aggregation level of the PDCCH, the total number of CCEs, etc., and a search space can be determined uniquely in the group of search spaces simply by the value of the CIF, and further a specific component carrier corresponding to the search space can be determined, so the CIF shall satisfy such a condition that the value of the CIF be in inverse proportion to the number of locations where the PDCCH may be possibly present at a specific aggregation level and in proportion to the sequence number of a search space, where the number of locations where the PDCCH may be possibly present is the quotient of the total number of CCEs available to the scheduling component carrier divided by the aggregation level of the PDCCH. Also since there are only 3 bits of the CIF, the value field of the CIF is {0~7}, where the CIF can take the 8 values in total of 0, 1, 2, 3, 4, 5, 6 and 7.

Optionally the value of the CIF can be calculated in the formula of $$\left\lfloor \frac{m + M^{(L)} \cdot n_{CI}}{\lfloor N_{CCE,k}/L \rfloor} \right\rfloor,$$

where m represents the sequence number of the location where the current PDCCH is located in the search space, L represents the aggregation level of the current PDCCH, $M^{(L)}$ represents the total number of candidate PDCCHs in a search space at the aggregation level of L, $n_{CI}$ represents the sequence number of the search space corresponding to the scheduled component carrier, $N_{CCE,k}$ represents the total number of CCEs available to the scheduling component carrier, and $\lfloor \ \rfloor$ represents a rounding-down operation.

Of course, the foregoing formula is merely a way to calculate the value of the CIF, and any other way to calculate a CIF satisfying the condition is also possible, for example, the CIF is calculated as a function or in another formula derived by transforming the formula of $$\left\lfloor \frac{m + M^{(L)} \cdot n_{CI}}{\lfloor N_{CCE,k}/L \rfloor} \right\rfloor.$$

In a practical application, the step 103 illustrated in FIG. 1 can be performed in a particular implementation in the sub-steps 401 and 402 referring to FIG. 4. Operations of the sub-steps 401 and 402 will be detailed below.

The sub-step 401 is to determine a group of search spaces corresponding to the current PDCCH by the location of the current PDCCH, where all search spaces corresponding to the same candidate PDCCH constitute the same group of search spaces.

The search spaces in this embodiment satisfy that DCI present at a specific location at a specific aggregation level is present only in search spaces of some specific component carriers and this specific set is determinate, so given the location of a candidate PDCCH and the RNTI and frame number of the UE, both the UE and the eNB can infer definitively search spaces of those possible component carriers to which the PDCCH at the location belongs.

Figure 5:
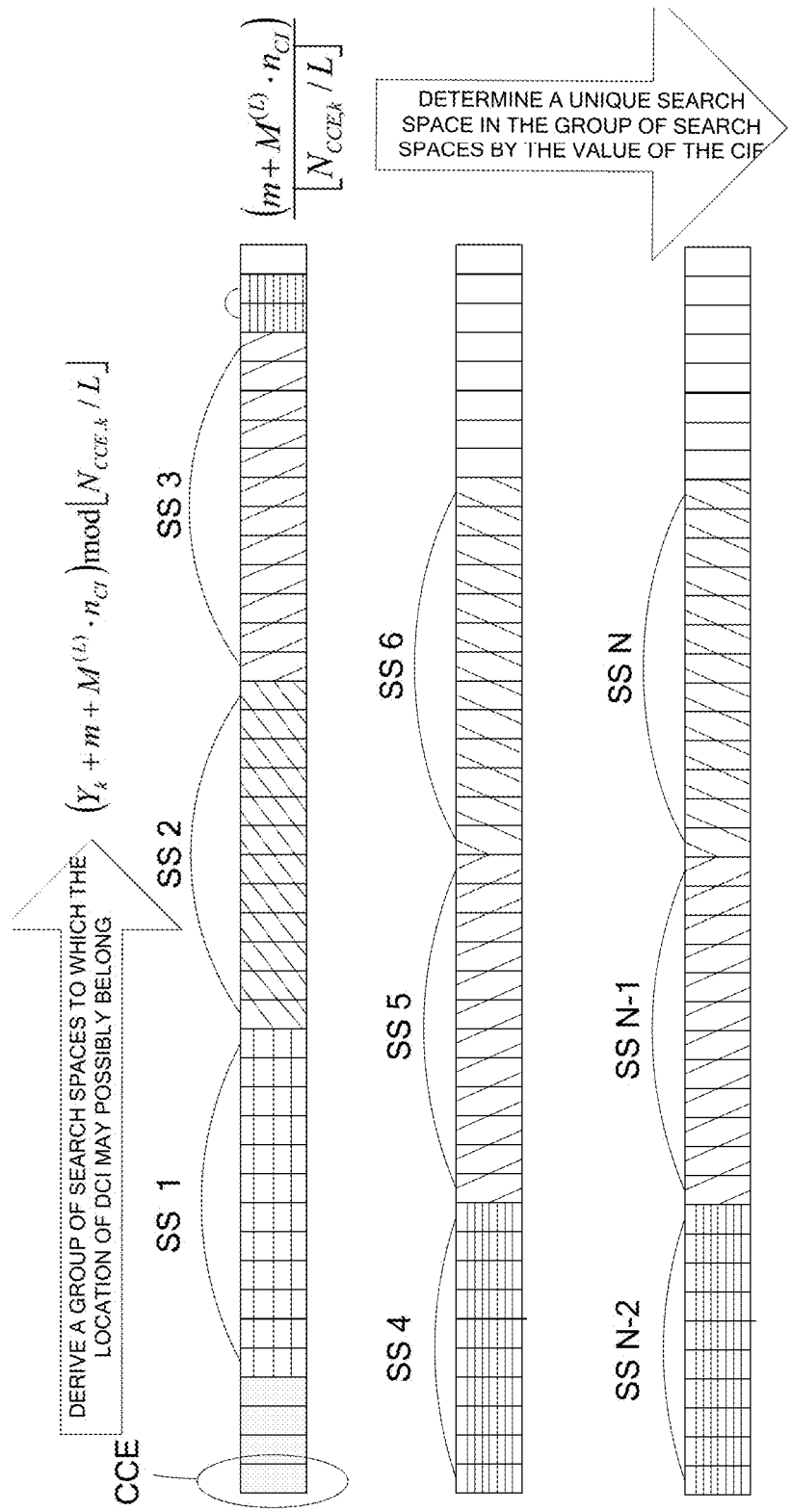
FIG. 5 is a schematic interface diagram of determining a group of search spaces and a search space respectively in an embodiment.

Referring to FIG. 5 illustrating a schematic interface diagram of determining a group of search spaces and a search space respectively in this embodiment. As can be apparent from FIG. 5, several possible component carriers to which the location of the current PDCCH belongs are located in the formula of $(Y_k+m+M^{(L)} \cdot n_{CI}) \bmod \lfloor N_{CCE,k}/L \rfloor$, that is, a group of search spaces to which the location of the PDCCH possibly belongs is determined. The value calculated in the formula of this paragraph is assumed as 6, and referring to FIG. 5, the first two PDCCHs are null, so the location of the 6$^{th}$ PDCCH can only belong to the group of search spaces in the first column where SS1 is located, i.e., {SS1, SS4, . . . , SSN-2}. Also as can be apparent from the distribution condition of the SSs in FIG. 5, each column of SSs in the vertical direction among the distributed SSs constitutes a group of SSs, e.g., {SS2, SS5, . . . , SSN-1}, {SS3, SS6, . . . , SSN}.

Here the sequence numbers of the respective SSs in each group of SSs are arranged at an equal interval, and the value of the specific interval depends upon the total number of CCEs and the aggregation level of the current PDCCH. The specific group of search space, i.e., the specific column of search spaces, to which the search space corresponding to the scheduled component carrier belongs can be determined after this step is performed.

The sub-step 402 is to determine a second dedicated search space to which the current PDCCH belongs in the group of search spaces by the value of the CIF, where the second dedicated search space is a search space corresponding to the scheduled component carrier, and the value of the CIF represents the number of reoccurrences of the location of the PDCCH in each of search spaces of different component carriers designed as per the size of the dedicated search space and the total number of available CCEs.

Among search spaces distributed as introduced in this embodiment, the lowly ranked search spaces of component carriers, e.g., the search spaces SS4, SS5 and SS6 in FIG. 5, will be arranged again starting from the location of the first CCE due to a modulation operation, so that there will be an overlapping part of the lowly ranked search spaces with the highly ranked search spaces. All the search spaces corresponding to the same candidate PDCCH constitute to the same group of search spaces, so a specific search space truly corresponding to a PDCCH detected in the overlapping part can not be identified in a group of search spaces in a column and furthermore a specific component carrier to which the PDCCH belongs can not be known without the value of the CIF as in the sub-step 401. Thus it is necessary for the value of the CIF to represent the number of reoccurrences of the location of the current PDCCH in each of search spaces of different component carriers designed as per the aggregation level of the PDCCH and the total number of available CCEs. A detailed description thereof has been given above by way of an example and will not be repeated here.

A specific component carrier to which currently detected DCI belongs can be determined uniquely only after the value of the CIF is available in the sub-step 402. In FIG. 5, the formula of $$\left\lfloor \frac{m + M^{(L)} \cdot n_{CI}}{\lfloor N_{CCE,k}/L \rfloor} \right\rfloor$$

is depicted to calculate the value of CIF, but those skilled in the art can know that this formula is merely one of numerous ways to calculate the CIF, and a way to calculate the CIF in the invention will not be limited thereto.

Since the UE in this embodiment only receives but does not calculate the value of the CIF transmitted from the eNB, the UE just calculates the value of $n_{CI}$ from the value of the formula $$\left\lfloor \frac{m + M^{(L)} \cdot n_{CI}}{\lfloor N_{CCE,k}/L \rfloor} \right\rfloor$$

and the known values of m, $M^{(L)}$, $N_{CCE,k}$ and L, where $n_{CI}$ represents uniquely the sequence number of a search space, and the UE can determine from the sequence number a uniquely search space and then obtain a scheduled component carrier corresponding to the search space.

In a practical application, the UE can receive downlink data and transmit uplink data over the corresponding component carrier upon determining the component carrier corresponding to the detected current PDCCH, so this embodiment can further include the step of receiving downlink data transmitted from the eNB or transmitting uplink data over the scheduled component carrier as per the scheduling information.

In the method of determining a scheduled component carrier by a UE as disclosed in this embodiment, the 3-bit CIF can support concurrent transmission of more than 8 component carriers, and the specific supported number depends upon the total number of CCEs and the aggregation level of the PDCCH. Alternatively in the case of ensuring that at least 8 component carriers can be supported at respective aggregation levels, only 2-bit information of the CIF is in use, and the remaining 1 bit can be reserved for extension. With the method of determining a scheduled component carrier as introduced in this embodiment, a larger number of component carriers can be determined, or the number of CIF bits in use can be reduced to schedule 8 component carriers as in the prior art to thereby conserve a system resource.

Figure 6:
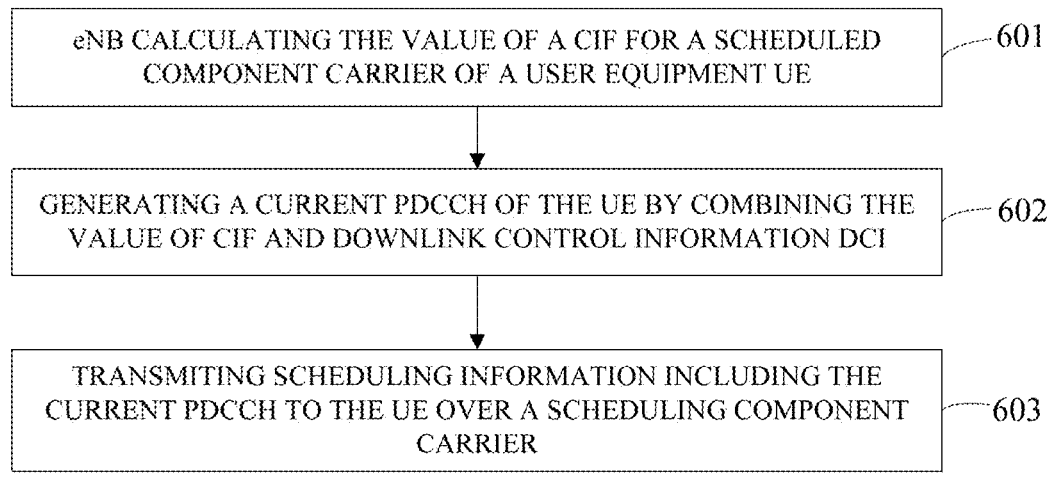
FIG. 6 is a schematic flow chart of an embodiment of transmitting scheduling information according to the invention.

Referring to FIG. 6 illustrating a flow chart of a second embodiment of the invention applicable to an eNB. This embodiment can particularly include the steps 601, 602 and 603. Operations of the respective steps will be detailed below.

In the step 601, an eNB calculates the value of a CIF for a scheduled component carrier of a User Equipment (UE).

In this embodiment, the eNB can calculate the value of the CIF to be transmitted to the UE by the identifier of the scheduled component carrier. After a current PDCCH is detected, the UE can know the location of the current PDCCH and further know those search spaces possibly present at the location of the current PDCCH, that is, determine search spaces possibly belonging to several specific component carriers, where these several determined search spaces can be regarded as a group of search spaces possibly present at the location of the PDCCH. Thus the eNB can simply calculate the value of the CIF so that the UE can further determine the search space of a specific component carrier in the determined group of search spaces by the value.

In this embodiment, the value of the CIF depends upon the aggregation level of the PDCCH, the total number of CCEs, etc., and a search space can be determined uniquely in the group of search spaces by the value of the CIF, so the CIF shall satisfy such a condition that the value of the CIF be in inverse proportion to the number of locations where the PDCCH may be possibly present at a specific aggregation level and in proportion to the sequence number of a search space, where the number of locations where the PDCCH may be possibly present is the quotient of the total number of CCEs available to a scheduling component carrier divided by the aggregation level of the PDCCH. Also since there are only 3 bits of the CIF, the value field of the CIF calculated by the eNB is {0~7}, where the CIF can take the 8 values in total of 0, 1, 2, 3, 4, 5, 6 and 7.

Optionally the eNB can calculate the value of the CIF in the formula of $$\left\lfloor \frac{m + M^{(L)} \cdot n_{CI}}{\lfloor N_{CCE,k}/L \rfloor} \right\rfloor,$$

where m represents the sequence number of the location where the current PDCCH is located in the search space, L represents the aggregation level of the current PDCCH, $M^{(L)}$ represents the total number of candidate PDCCHs in a search space at the aggregation level of L, $n_{CI}$ represents the sequence number of the search space corresponding to the scheduled component carrier, $N_{CCE,k}$ represents the total number of CCEs available to the scheduling component carrier, and $\lfloor \ \rfloor$ represents a rounding-down operation.

Of course, the foregoing formula is merely a way to calculate the value of the CIF by the eNB, and any other way to calculate a CIF satisfying the condition is also possible, for example, the CIF is calculated as a function or in another formula derived by transforming the formula of $$\left\lfloor \frac{m + M^{(L)} \cdot n_{CI}}{\lfloor N_{CCE,k}/L \rfloor} \right\rfloor.$$

The step 602 is to generate a current PDCCH of the UE based upon the value of the CIF and Downlink Control Information (DCI) and to put the current PDCCH at an appropriate CCE location.

The eNB further generates a current PDCCH of the UE based upon the calculated value of the CIF and DCI information and puts the current PDCCH at an appropriate CCE location. The current PDCCH corresponds in a one-to-one manner to the scheduled component carrier and is transmitted to the UE over a scheduling component carrier.

The step 603 is to transmit scheduling information including the current PDCCH to the UE over a scheduling component carrier.

With the method of transmitting scheduling information as disclosed in the embodiment of the invention, the eNB can derive the value of the CIF in a special calculation way, and although the length of the CIF is still 3 bits, what the CIF represents has changed, and the method disclosed in this embodiment can enable the UE receiving the scheduling information to determine a larger number of component carriers, and furthermore the eNB can alternatively have 8 component carriers determined from only two bits of the CIF and then carry other control information in the remaining one bit of the CIF to thereby conserve a system resource.

It shall be noted that the steps performing the foregoing series of processes can naturally be performed sequentially in the described order but may not necessary be performed sequentially. Some of the steps can be performed concurrently or independent of each other.

Figure 7:
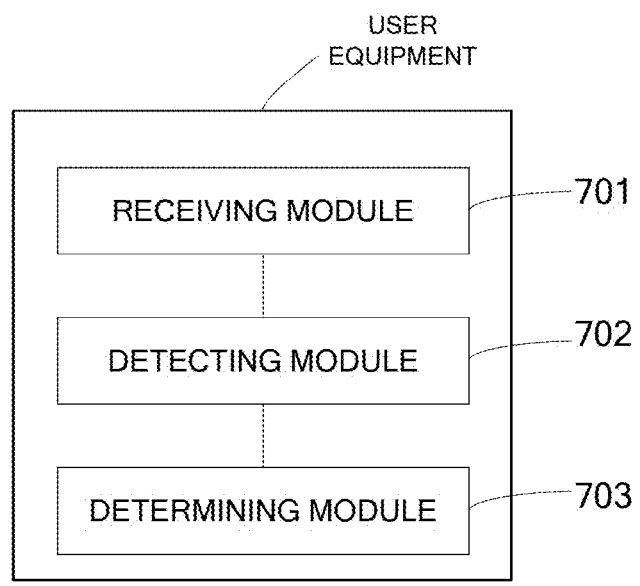
FIG. 7 is a schematic structural diagram of a user equipment according to an embodiment of the invention.

Referring to FIG. 7 illustrating an embodiment of a User Equipment (UE) according to the invention, which can be applicable to a multi-carrier wireless communication system and which includes: a scheduling information detecting module 701 configured to receive scheduling information transmitted from an eNB in a first dedicated search space corresponding to a scheduling component carrier of the UE, where the scheduling information includes at least one candidate Physical Downlink Control CHannel (PDCCH); a candidate PDCCH detecting module 702 configured to detect the at least candidate PDCCH for a current PDCCH belonging to the UE; and a determining module 703 configured to determine a scheduled component carrier corresponding to the current PDCCH according to the location of the current PDCCH and the value of a Carrier Indicator Field (CIF) carried therein.

The determining module 703 can be further configured to include a first determining sub-module configured to determine a group of search spaces corresponding to the current PDCCH by the location of the current PDCCH, where all search spaces corresponding to the same candidate PDCCH constitute the same group of search spaces; and a second determining sub-module configured to determine a second dedicated search space to which the current PDCCH belongs in the group of search spaces by the value of the CIF, where the second dedicated search space is a search space corresponding to the scheduled component carrier, and the value of the CIF represents the number of times that different search spaces are ranked as per the aggregation level of the current PDCCH and the total number of available CCEs without being repeated.

In this embodiment of the UE, the value of the CIF is in inverse proportion to the number of locations where the PDCCH may be possibly present at a specific aggregation level and in proportion to the sequence number of a search space, where the number of locations where the PDCCH may be possibly present is the quotient of the total number of CCEs available to the scheduling component carrier divided by the aggregation level of the current PDCCH, and the value of the CIF ranges from 0 to 7.

Optionally the CIF is calculated particularly in the formula of $$\left\lfloor \frac{m + M^{(L)} \cdot n_{CI}}{\lfloor N_{CCE,k}/L \rfloor} \right\rfloor,$$

where m represents the sequence number of the location where the current PDCCH is located in the search space, L represents the aggregation level of the current PDCCH, $M^{(L)}$ represents the total number of candidate PDCCHs in a search space at the aggregation level of L, $n_{CI}$ represents the sequence number of the search space corresponding to the scheduled component carrier, $N_{CCE,k}$ represents the total number of CCEs available to the scheduling component carrier, and $\lfloor\ \rfloor$ represents a rounding-down operation.

The respective search spaces of the UE disclosed in this embodiment are distributed consecutively or at a fixed interval so that the sequence numbers of search spaces in each group of search spaces are distributed at an equal interval. Of course those skilled in the art any other various search space distributions with similar characteristics can also be feasible.

In a practical application, the UE can further include a data processing module configured to receive downlink data transmitted from the eNB or transmit uplink data over the scheduled component carrier as per the scheduling information.

Figure 8:
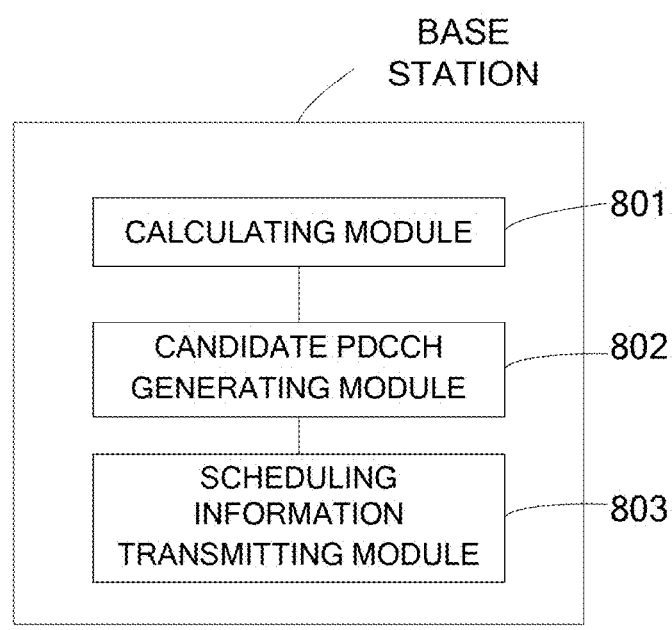
FIG. 8 is a schematic structural diagram of a base station according to an embodiment of the invention.

Referring to FIG. 8 illustrating a schematic structural diagram of a base station according to an embodiment of the invention, which can be applicable to a multi-carrier wireless communication system and which particularly includes: a calculating module 801 configured to calculate the value of a Carrier Indicator Field (CIF) for a scheduled component carrier of a User Equipment (UE); a candidate PDCCH generating module 802 configured to generate a current PDCCH of the UE by combining the value of the CIF and Downlink Control Information (DCI); and a scheduling information transmitting module 803 configured to transmit scheduling information including the current PDCCH to the UE over a scheduling component carrier.

In an embodiment of the eNB, the calculating module 801 can be further configured to calculate the value of the CIF for the scheduled component carrier of the UE to satisfy such a condition that the value of the CIF be in inverse proportion to the number of pieces of Downlink Control Information (DCI) and in proportion to the number of candidate PDCCHs of a search space, where the number of pieces of DCI is the quotient of the total number of CCEs available to the scheduling component carrier divided by the aggregation level of the current PDCCH. Also since there are only 3 bits of the CIF, the value field of the CIF is {0~7}, and the value of the CIF ranges from 0 to 7.

Alliteratively the calculating module 801 can be further configured to calculate the value of the Carrier Indicator Field (CIF) in the formula of $$\left\lfloor \frac{m + M^{(L)} \cdot n_{CI}}{\lfloor N_{CCE,k}/L \rfloor} \right\rfloor,$$

where m represents the sequence number where the PDCCH is located in the search space, L represents the aggregation level of the current PDCCH, $M^{(L)}$ represents the total number of candidate PDCCHs in a search space at the aggregation level of L, $n_{CI}$ represents the sequence number of the search space corresponding to the scheduled component carrier, $N_{CCE,k}$ represents the total number of CCEs available to the scheduling component carrier, and $\lfloor\ \rfloor$ represents a rounding-down operation.

Figure 9:
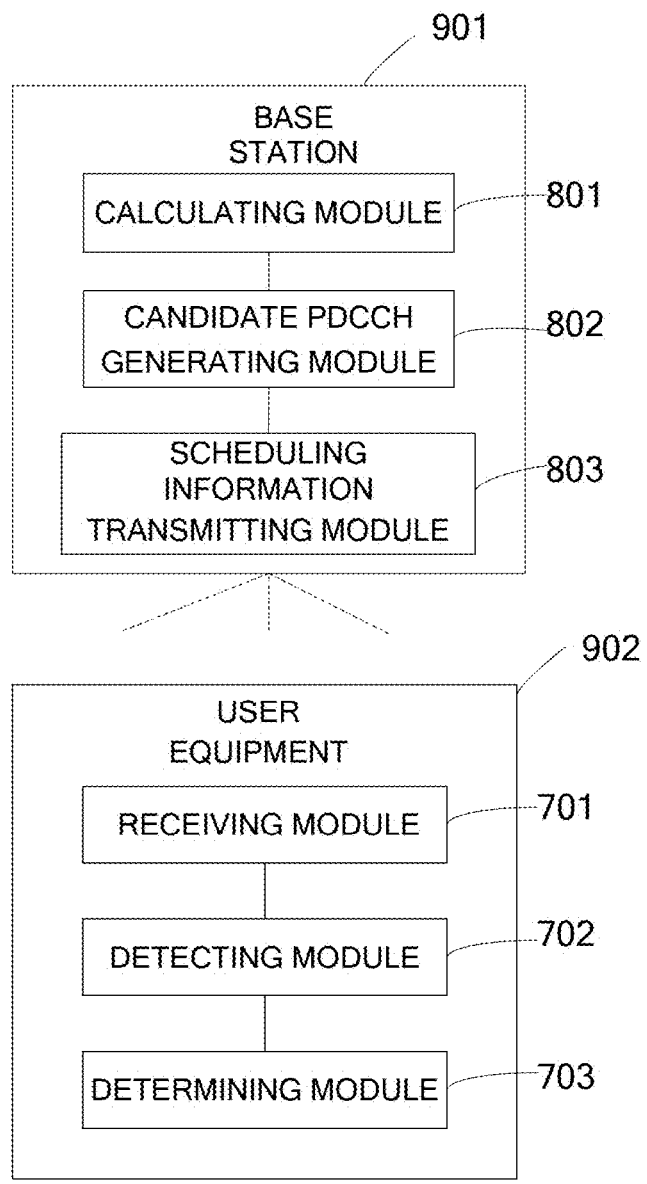
FIG. 9 is a schematic structural diagram of an embodiment of a multi-carrier wireless system according to the invention.

Referring to FIG. 9, an embodiment of the invention further discloses a multi-carrier wireless system which can include the user equipment described in any preceding embodiment and the base station described in any preceding embodiment.

It shall be noted that the multi-carrier wireless system in this embodiment can include, for example, the UE as illustrated in FIG. 7 and the base station as illustrated in FIG. 8. Reference can be made to the description above with reference to FIG. 1 to FIG. 8 for a method of determining a scheduled component carrier between the base station and the User Equipment (UE) of the system, and a detailed description thereof will be omitted here. Furthermore FIG. 9 illustrates a scenario where one base station communicates with one user equipment, but those skilled in the art shall appreciate that the communication system in this embodiment of the invention can further include a plurality of user equipments each of which can perform the method of determining a scheduled component carrier described in the foregoing respective embodiments of the invention.

An embodiment of the invention discloses a program product on which machine readable instruction codes are stored, where the instruction codes upon being read and executed by a machine can perform the method of determining a scheduled component carrier as disclosed in the invention. Also an embodiment of the invention further discloses a storage medium on which machine readable instruction codes are borne, where the instruction codes upon being read and executed by a machine can perform the method of determining a scheduled component carrier described in the foregoing embodiments of the invention.

Additionally it shall be further noted that the series of processes and devices described in the foregoing respective embodiments can also be embodied in software and/or firmware. In the case of being embodied in software and/or firmware, program constituting the software can be installed from a storage medium or a network to a computer with a dedicated hardware structure, e.g., a general personal computer 100 illustrated in FIG. 10, which can perform various functions when various items of programs are installed thereon.

Figure 10:
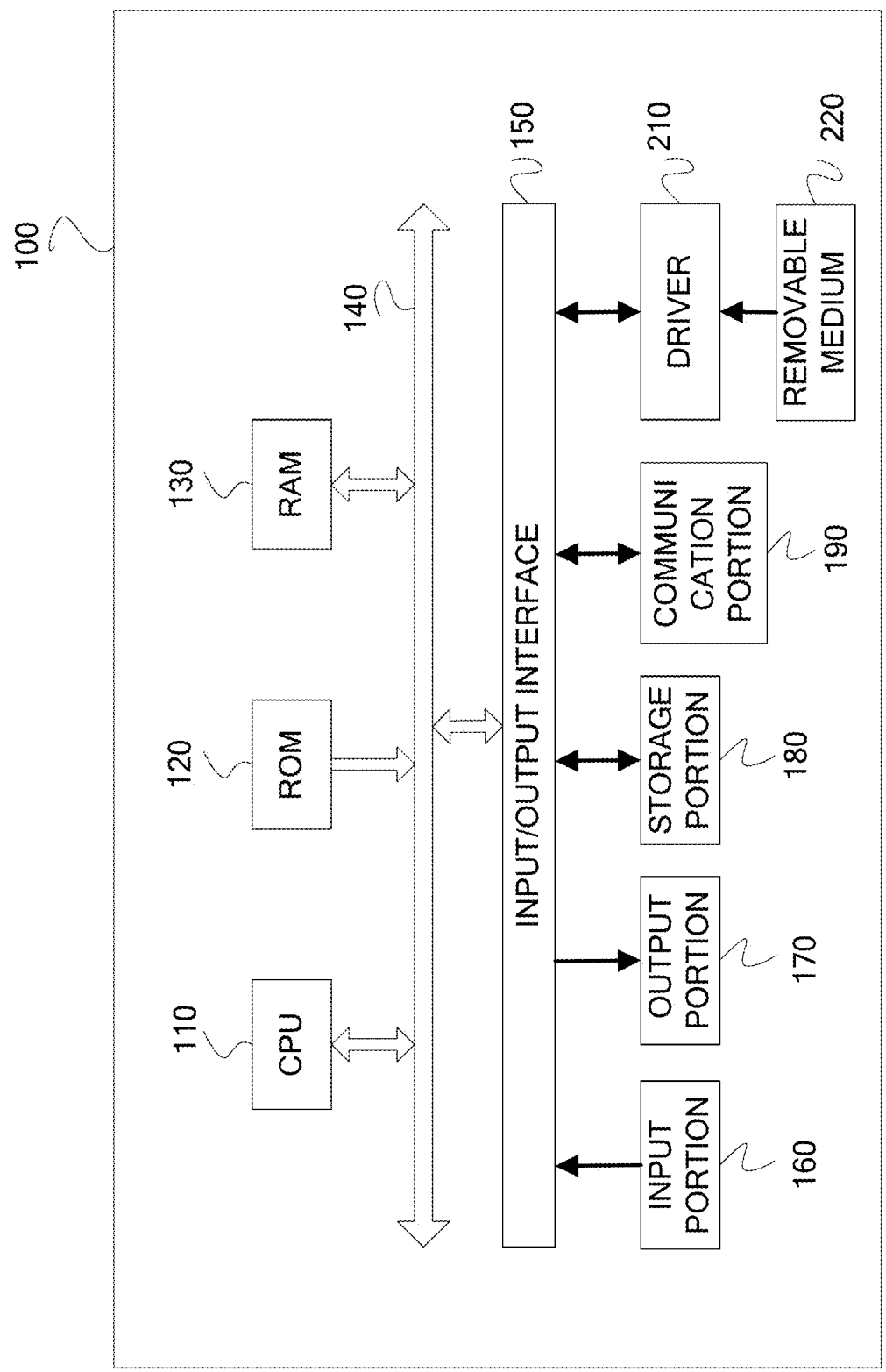
FIG. 10 is a schematic structural diagram of a general personal computer 100 in which an embodiment of the invention can be practiced.

In FIG. 10, a Central Processing Unit (CPU) 110 performs various processes according to program stored in a Read Only Memory (ROM) 120 or program loaded from a storage portion 180 into a Random Access Memory (RAM) 130 in which data required when the CPU 110 performs various processes, etc., is also stored as needed.

The CPU 110, the ROM 120 and the RAM 130 are connected to each other via a bus 140 to which an input/output interface 150 is also connected.

The following components are connected to the input/output interface 150: an input portion 160 including a keyboard, a mouse, etc.; an output portion 170 including a display, e.g., a Cathode Ray Tube (CRT), a Liquid Crystal Display (LCD), etc., a speaker, etc.; a storage port 180 including a hard disk, etc.; and a communication portion 190 including a network interface card, e.g., an LAN card, a modem, etc. The communication portion 190 performs a communication process over a network, e.g., the Internet.

A driver 210 can also be connected to the input/output interface 150. A removable medium 220, e.g., a magnetic disk, an optical disk, an optic-magnetic disk, a semiconductor memory, etc., can be installed on the driver 210 as needed so that computer program fetched therefrom can be installed into the storage portion 180 as needed.

In the case that the foregoing series of processes are performed in software, program constituting the software can be installed from a network, e.g., the Internet, etc., or a storage medium, e.g., the removable medium 220, etc.

Those skilled in the art shall appreciate that such a storage medium will not be limited to the removable medium 220 illustrated in FIG. 10 in which the program is stored and which is distributed separately from the device to provide a user with the program. Examples of the removable medium 220 include a magnetic disk (including a Floppy Disk (a registered trademark)), an optical disk (including a Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 120, a hard disk included in the storage port 180, etc., in which the program is stored and which is distributed together with the device including the same to the user.

With respect to the implementations of the embodiments above, the following technical solutions are disclosed:

Solution 1. A method, applied in a user equipment of a multi-carrier wireless communication system, of determining a scheduled component carrier, comprising:

the user equipment detecting scheduling information transmitted from a base station in a first dedicated search space corresponding to a scheduling component carrier, wherein the first dedicated search space comprises at least one candidate physical downlink control channel;

detecting the at least one candidate physical downlink control channel for obtaining a current physical downlink control channel belonging to the user equipment; and determining the scheduled component carrier corresponding to the current physical downlink control channel according to the location of the current physical downlink control channel and the value of a carrier indicator field carried therein.

Solution 2. The method of determining a scheduled component carrier according to solution 1, wherein the process of determining the scheduled component carrier corresponding to the current physical downlink control channel according to the location of the current physical downlink control channel and the value of a carrier indicator field carried therein further comprises:

determining a group of search spaces corresponding to the current physical downlink control channel by the location of the current physical downlink control channel, wherein all search spaces corresponding to the location of the same candidate physical downlink control channel at the same aggregation level of the physical downlink control channel constitute the same group of search spaces; and determining a second dedicated search space to which the current physical downlink control channel belongs in the group of search spaces by the value of the carrier indicator field, wherein the second dedicated search space is a search space corresponding to the scheduled component carrier, and the value of the carrier indicator field represents the number of reoccurrences of the location of the physical downlink control channel in each of search spaces, in the case that the search spaces of different component carriers are designed as per the size of the second dedicated search space of the current physical downlink control channel and the total number of available control channel elements.

Solution 3. The method of determining a scheduled component carrier according to solution 1 or 2, wherein the value of the carrier indicator field is in inverse proportion to the number of locations where the physical downlink control channel may be possibly present at a specific aggregation level and in proportion to the sequence number of a search space, the number of locations where the physical downlink control channel may be possibly present is the quotient of the total number of control channel elements available to the scheduling component carrier divided by the aggregation level of the current physical downlink control channel, and the value field of the carrier indicator field is $\{0\sim7\}$.

Solution 4. The method of determining a scheduled component carrier according to solution 3, wherein the carrier indicator field is further calculated in the formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents the total number of candidate physical downlink control channels in a search space at the aggregation level of L, $n_{CI}$ represents the sequence number of the search space corresponding to the scheduled component carrier, $N_{CCE,k}$ represents the total number of control channel elements available to the scheduling component carrier, and $\lfloor \ \rfloor$ represents a rounding-down operation.

Solution 5. The method of determining a scheduled component carrier according to solution 1 or 2, wherein the respective search spaces are distributed consecutively or at a fixed interval.

Solution 6. The method of determining a scheduled component carrier according to any one of solutions 1 to 5, wherein after the scheduled component carrier corresponding to the current physical downlink control channel is determined, the method further comprising:

receiving downlink data transmitted from the base station or transmitting uplink data over the scheduled component carrier as per the scheduling information.

Solution 7. A user equipment, applicable to a multi-carrier wireless communication system, comprising:

a scheduling information detecting module configured to detect scheduling information transmitted from a base station in a first dedicated search space corresponding to a scheduling component carrier, wherein the first dedicated search space comprises at least one candidate physical downlink control channel;

a candidate physical downlink control channel detecting module configured to detect the at least one candidate physical downlink control channel for obtaining a current physical downlink control channel belonging to the user equipment; and a determining module configured to determine a scheduled component carrier corresponding to the current physical downlink control channel according to the location of the current physical downlink control channel and the value of a carrier indicator field carried therein.

Solution 8. The user equipment according to solution 7, wherein the determining module comprises:

a first determining sub-module configured to determine a group of search spaces corresponding to the current physical downlink control channel by the location of the current physical downlink control channel, wherein all search spaces corresponding to the location of the same candidate physical downlink control channel at the same aggregation level of the physical downlink control channel constitute the same group of search spaces; and a second determining sub-module configured to determine a second dedicated search space to which the current physical downlink control channel belongs in the group of search spaces by the value of the carrier indicator field, wherein the second dedicated search space is a search space corresponding to the scheduled component carrier, and the value of the carrier indicator field represents the number of reoccurrences of the location of the physical downlink control channel in each of search spaces, in the case that the search spaces of different component carriers are designed as per the size of the dedicated search space of the current physical downlink control channel and the total number of available control channel elements.

Solution 9. The user equipment according to solution 7 or 8, wherein the value of the value of the carrier indicator field is in inverse proportion to the number of locations where the physical downlink control channel may be possibly present at a specific aggregation level and in proportion to the sequence number of a search space, and the number of locations where the physical downlink control channel may be possibly present is the quotient of the total number of control channel elements available to the scheduling component carrier divided by the aggregation level of the current physical downlink control channel, and the value field of the carrier indicator field is {0~7}.

Solution 10. The user equipment according to solution 9, wherein the carrier indicator field is calculated particularly in the formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents the total number of candidate physical downlink control channels in a search space at the aggregation level of L, $n_{CI}$ represents the sequence number of the search space corresponding to the scheduled component carrier, $N_{CCE,k}$ represents the total number of control channel elements available to the scheduling component carrier, and $\lfloor \ \rfloor$ represents a rounding-down operation.

Solution 11. The user equipment according to solution 7 or 8, wherein the respective search spaces are distributed consecutively or at a fixed interval.

Solution 12. The user equipment according to any one of solutions 7 to 11, further comprising:

a data processing module configured to receive downlink data transmitted from the base station or transmit uplink data over the scheduled component carrier as per the scheduling information.

Solution 13. A method, applied in a base station of a multi-carrier wireless communication system, of transmitting scheduling information of a scheduled component carrier, comprising:

calculating the value of a carrier indicator field for a scheduled component carrier of a user equipment;

generating a current physical downlink control channel of the user equipment by combining the value of the carrier indicator field and downlink control information; and transmitting scheduling information comprising the current physical downlink control channel to the user equipment over a scheduling component carrier.

Solution 14. The method of transmitting scheduling information of a scheduled component carrier according to solution 13, wherein the value of the carrier indicator field is in inverse proportion to the number of locations where the physical downlink control channel may be possibly present at a specific aggregation level and in proportion to the sequence number of a search space, the number of locations where the physical downlink control channel may be possibly present is the quotient of the total number of control channel elements available to the scheduling component carrier divided by the aggregation level of the current physical downlink control channel, and the value field of the carrier indicator field is {0~7}.

Solution 15. The method of transmitting scheduling information of a scheduled component carrier according to solution 14, wherein the carrier indicator field is calculated particularly in the formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents the total number of candidate physical downlink control channels in a search space at the aggregation level of L, $n_{CI}$ represents the sequence number of the search space corresponding to the scheduled component carrier, $N_{CCE,k}$ represents the total number of control channel elements available to the scheduling component carrier, and $\lfloor \ \rfloor$ represents a rounding-down operation.

Solution 16. A base station, applicable to a multi-carrier wireless communication system, comprising:

a calculating module configured to calculate the value of a carrier indicator field for a scheduled component carrier of a user equipment;

a candidate physical downlink control channel generating module configured to generate a current physical downlink control channel of the user equipment by combining the value of the carrier indicator field and downlink control information; and a scheduling information transmitting module configured to transmit scheduling information including the current physical downlink control channel to the user equipment over a scheduling component carrier.

Solution 17. The base station according to solution 16, wherein the calculating module is further configured to calculate the value of the carrier indicator field for the scheduled component carrier of the user equipment to satisfy such a condition that:

the value of the carrier indicator field is in inverse proportion to the number of locations where the physical downlink control channel may be possibly present at a specific aggregation level and in proportion to the sequence number of a search space, wherein the number of locations where the physical downlink control channel may be possibly present is the quotient of the total number of control channel elements available to the scheduling component carrier divided by the aggregation level of the current physical downlink control channel, and the value field of the carrier indicator field is {0~7}.

Solution 18. The base station according to solution 17, wherein the calculating module is further configured:

to calculate the carrier indicator field in the formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents the total number of candidate physical downlink control channels in a search space at the aggregation level of L, $n_{CI}$ represents the sequence number of the search space corresponding to the scheduled component carrier, $N_{CCE,k}$ represents the total number of control channel elements available to the scheduling component carrier, and $\lfloor \ \rfloor$ represents a rounding-down operation.

Solution 19. A multi-carrier wireless communication system, comprising the user equipment according to any one of solutions 7 to 12 and the base station according to any one of solutions 16 to 18.

Solution 20. A program product on which machine readable instruction codes are stored, wherein the instruction codes upon being read and executed by a machine can perform the method of determining a scheduled component carrier according to any one of solutions 1 to 6 or the method of transmitting scheduling information of a scheduled component carrier according to any one of solutions 13 to 15.

Solution 21. A storage medium on which machine readable instruction codes are borne, wherein the instruction codes upon being read and executed by a machine can perform the method of determining a scheduled component carrier according to any one of solutions 1 to 6 or the method of transmitting scheduling information of a scheduled component carrier according to any one of solutions 13 to 15.

Although the invention and the advantages thereof have been detailed, it shall be appreciated that various modifications, alternatives and alterations can be made without departing from the spirit and scope of the invention as defined in the appended claims. And the terms "include" and "comprise" or any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical elements in the process, the method, the article or the device including the element.

What is claimed is:

1. A method, applied in a user equipment of a multi-carrier wireless communication system, of determining a scheduled component carrier, the method comprising:

the user equipment detecting scheduling information transmitted from a base station in a first dedicated search space corresponding to a scheduling component carrier, wherein the first dedicated search space comprises at least one candidate physical downlink control channel;

detecting the at least one candidate physical downlink control channel for obtaining a current physical downlink control channel belonging to the user equipment;

determining the scheduled component carrier corresponding to the current physical downlink control channel according to a location of the current physical downlink control channel and a value of a carrier indicator field carried therein;

determining a group of search spaces corresponding to the current physical downlink control channel by the location of the current physical downlink control channel, wherein all search spaces corresponding to the location of a same candidate physical downlink control channel at a same aggregation level of the physical downlink control channel constitute a same group of search spaces; and determining a second dedicated search space to which the current physical downlink control channel belongs in the group of search spaces by the value of the carrier indicator field, wherein the second dedicated search space is a search space corresponding to the scheduled component carrier, and the value of the carrier indicator field represents a number of reoccurrences of the location of the physical downlink control channel in each of search spaces, in a case that search spaces of different component carriers are designed as per a size of the second dedicated search space of the current physical downlink control channel and a total number of available control channel elements.

2. The method of determining the scheduled component carrier according to claim 1, wherein the value of the carrier indicator field is in inverse proportion to a number of locations where the physical downlink control channel may be possibly present at a specific aggregation level and in proportion to a sequence number of a search space, the number of locations where the physical downlink control channel may be possibly present is a quotient of the total number of control channel elements available to the scheduling component carrier divided by an aggregation level of the current physical downlink control channel, and a value field of the carrier indicator field is {0~7}.

3. The method of determining the scheduled component carrier according to claim 2, wherein the carrier indicator field is further calculated in a formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents a total number of candidate physical downlink control channels in a search space at the aggregation level of L, $n_{CI}$ represents the sequence number of a search space corresponding to the scheduled component carrier, $N_{CCE,k}$ represents the total number of control channel elements available to the scheduling component carrier, and $\lfloor \ \rfloor$ represents a rounding-down operation.

4. The method of determining the scheduled component carrier according to claim 1, wherein the respective search spaces are distributed consecutively or at a fixed interval.

5. The method of determining the scheduled component carrier according to claim 1, wherein after the scheduled component carrier corresponding to the current physical downlink control channel is determined, the method further comprising:
receiving downlink data transmitted from the base station or transmitting uplink data over the scheduled component carrier as per the scheduling information.

6. A user equipment, applicable to a multi-carrier wireless communication system, the user equipment comprising:
a scheduling information detecting module configured to detect scheduling information transmitted from a base station in a first dedicated search space corresponding to a scheduling component carrier, wherein the first dedicated search space comprises at least one candidate physical downlink control channel;
a candidate physical downlink control channel detecting module configured to detect the at least one candidate physical downlink control channel for obtaining a current physical downlink control channel belonging to the user equipment; and
a determining module configured to determine a scheduled component carrier corresponding to the current physical downlink control channel according to a location of the current physical downlink control channel and a value of a carrier indicator field carried therein,
a first determining sub-module configured to determine a group of search spaces corresponding to the current physical downlink control channel by the location of the current physical downlink control channel, wherein all search spaces corresponding to a location of a same candidate physical downlink control channel at a same aggregation level of the physical downlink control channel constitute a same group of search spaces; and
a second determining sub-module configured to determine a second dedicated search space to which the current physical downlink control channel belongs in the group of search spaces by the value of the carrier indicator field, wherein the second dedicated search space is a search space corresponding to the scheduled component carrier, and the value of the carrier indicator field represents a number of reoccurrences of the location of the physical downlink control channel in each of search spaces, in a case that search spaces of different component carriers are designed as per a size of the dedicated search space of the current physical downlink control channel and a total number of available control channel elements.

7. The user equipment according to claim 6, wherein the value of the carrier indicator field is in inverse proportion to a number of locations where the physical downlink control channel may be possibly present at a specific aggregation level and in proportion to a sequence number of a search space, and the number of locations where the physical downlink control channel may be possibly present is a quotient of the total number of control channel elements available to the scheduling component carrier divided by an aggregation level of the current physical downlink control channel, and a value field of the carrier indicator field is {0~7}.

8. The user equipment according to claim 7, wherein the carrier indicator field is calculated particularly in a formula of $$\left\lfloor \frac{m + M^{(L)} \cdot n_{CI}}{\lfloor N_{CCE,k}/L \rfloor} \right\rfloor,$$

wherein m represents the sequence number of the location where the current physical downlink control channel is located in the search space, L represents the aggregation level of the current physical downlink control channel, $M^{(L)}$ represents a total number of candidate physical downlink control channels in a search space at the aggregation level of L, $n_{CI}$ represents the sequence number of the search space corresponding to the scheduled component carrier, $N_{cCE,k}$ represents the total number of control channel elements available to the scheduling component carrier, and $\lfloor \ \rfloor$ represents a rounding-down operation.

9. The user equipment according to claim 6, wherein respective search spaces are distributed consecutively or at a fixed interval.

10. The user equipment according to claim 6, further comprising:
a data processing module configured to receive downlink data transmitted from the base station or transmit uplink data over the scheduled component carrier as per the scheduling information.

11. A base station, applicable to a multi-carrier wireless communication system, the base station comprising:
a calculating module configured to calculate a value of a carrier indicator field for a scheduled component carrier of a user equipment;
a candidate physical downlink control channel generating module configured to generate a current physical downlink control channel of the user equipment by combining the value of the carrier indicator field and downlink control information; and a scheduling information transmitting module configured to transmit scheduling information including the current physical downlink control channel to the user equipment over a scheduling component carrier, wherein the value of the carrier indicator field represents a number of reoccurrences of a location of the physical downlink control channel in each of search spaces, in a case that search spaces of different component carriers are designed as per a size of a dedicated search space of the current physical downlink control channel and a total number of available control channel elements, wherein the dedicated search space is a search space to which the current physical downlink control channel belongs and which is corresponding to the scheduled component carrier.

12. The base station according to claim 11, wherein the calculating module is further configured to calculate the value of the carrier indicator field for the scheduled component carrier of the user equipment to satisfy such a condition that:

the value of the carrier indicator field is in inverse proportion to a number of locations where the physical downlink control channel may be possibly present at a specific aggregation level and in proportion to a sequence number of a search space, wherein the number of locations where the physical downlink control channel may be possibly present is a quotient of a total number of control channel elements available to the scheduling component carrier divided by an aggregation level of the current physical downlink control channel, and a value field of the carrier indicator field is {0~7}.

13. The base station according to claim 12, wherein the calculating module is further configured:

to calculate the carrier indicator field in a formula of $$\left\lfloor \frac{m + M^{(L)} \cdot n_{CI}}{\lfloor N_{CCE,k} / L \rfloor} \right\rfloor,$$

wherein m represents the sequence number of the location where the current physical downlink control channel is located in the search space, L represents the aggregation level of the current physical downlink control channel, $M^{(L)}$ represents a total number of candidate physical downlink control channels in a search space at the aggregation level of L, $n_{CI}$ represents the sequence number of a search space corresponding to the scheduled component carrier, $N_{CCE,k}$ represents the total number of control channel elements available to the scheduling component carrier, and $\lfloor\ \rfloor$ represents a rounding-down operation.

14. A multi-carrier wireless communication system, comprising a user equipment and a base station, wherein the user equipment, applicable to the multi-carrier wireless communication system, comprises:

a scheduling information detecting module configured to detect scheduling information transmitted from the base station in a first dedicated search space corresponding to a scheduling component carrier, wherein the first dedicated search space comprises at least one candidate physical downlink control channel;

a candidate physical downlink control channel detecting module configured to detect the at least one candidate physical downlink control channel for obtaining a current physical downlink control channel belonging to the user equipment; and a determining module configured to determine a scheduled component carrier corresponding to the current physical downlink control channel according to a location of the current physical downlink control channel and a value of a carrier indicator field carried therein, wherein the determining module comprises:

a first determining sub-module configured to determine a group of search spaces corresponding to the current physical downlink control channel by the location of the current physical downlink control channel, wherein all search spaces corresponding to the location of a same candidate physical downlink control channel at a same aggregation level of the physical downlink control channel constitute a same group of search spaces; and a second determining sub-module configured to determine a second dedicated search space to which the current physical downlink control channel belongs in the group of search spaces by the value of the carrier indicator field, wherein the second dedicated search space is a search space corresponding to the scheduled component carrier, and the value of the carrier indicator field represents a number of reoccurrences of the location of the physical downlink control channel in each of search spaces, in a case that search spaces of different component carriers are designed as per a size of the dedicated search space of the current physical downlink control channel and a total number of available control channel elements; and the base station, applicable to the multi-carrier wireless communication system, comprises:

a calculating module configured to calculate the value of the carrier indicator field for the scheduled component carrier of the user equipment;

a candidate physical downlink control channel generating module configured to generate the current physical downlink control channel of the user equipment by combining the value of the carrier indicator field and downlink control information; and a scheduling information transmitting module configured to transmit scheduling information including the current physical downlink control channel to the user equipment over the scheduling component carrier, wherein the value of the carrier indicator field represents the number of reoccurrences of the location of the physical downlink control channel in each of search spaces, in the case that search spaces of different component carriers are designed as per the size of the dedicated search space of the current physical downlink control channel and the total number of available control channel elements, wherein the dedicated search space is a search space to which the current physical downlink control channel belongs and which is corresponding to the scheduled component carrier.

* * * * *